US008867736B2

(12) United States Patent
Gaggl et al.

(10) Patent No.: US 8,867,736 B2
(45) Date of Patent: *Oct. 21, 2014

(54) DEVICE FOR CONTROLLING A SUPPLY VOLTAGE FOR A TERMINAL

(75) Inventors: Richard Gaggl, Poertschach (AT);
Christian Jenkner, Klagenfurt (AT);
Gerhard Noessing, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 315 days.

This patent is subject to a terminal disclaimer.

(21) Appl. No.: 13/340,180

(22) Filed: Dec. 29, 2011

(65) Prior Publication Data

US 2012/0099724 A1    Apr. 26, 2012

Related U.S. Application Data

(63) Continuation of application No. 12/057,547, filed on Mar. 28, 2008, now Pat. No. 8,111,824.

(30) Foreign Application Priority Data

Mar. 28, 2007   (DE) .......................... 10 2007 015 005

(51) Int. Cl.
*H04M 1/00*   (2006.01)
*H04M 9/00*   (2006.01)
*H04M 19/00*  (2006.01)

(52) U.S. Cl.
CPC .................................. *H04M 19/005* (2013.01)
USPC ........................................................ 379/413

(58) Field of Classification Search
USPC ........................................................ 379/413
See application file for complete search history.

(56) References Cited

U.S. PATENT DOCUMENTS 6,735,302 B1 *   5/2004   Caine et al. ................... 379/405

* cited by examiner

*Primary Examiner* — Alexander Jamal

(57) ABSTRACT

A control device includes a circuit operable to sense an analog input voltage dependent on a line current flowing via a communication line of a terminal generate an analog difference voltage in a constant line current operation based on a difference between the sensed analog input voltage and an analog feedback voltage which depends on an adjustable nominal direct-current value and filter a sequence of control error values from a sequence of digital difference voltage values converted from the generated analog difference voltage. The circuit is further operable to convert a control value generated from the sequence of control error values in the constant line current operation to an analog direct voltage for supplying the terminal and convert the nominal direct-current value into the analog feedback voltage in the constant line current operation.

32 Claims, 14 Drawing Sheets

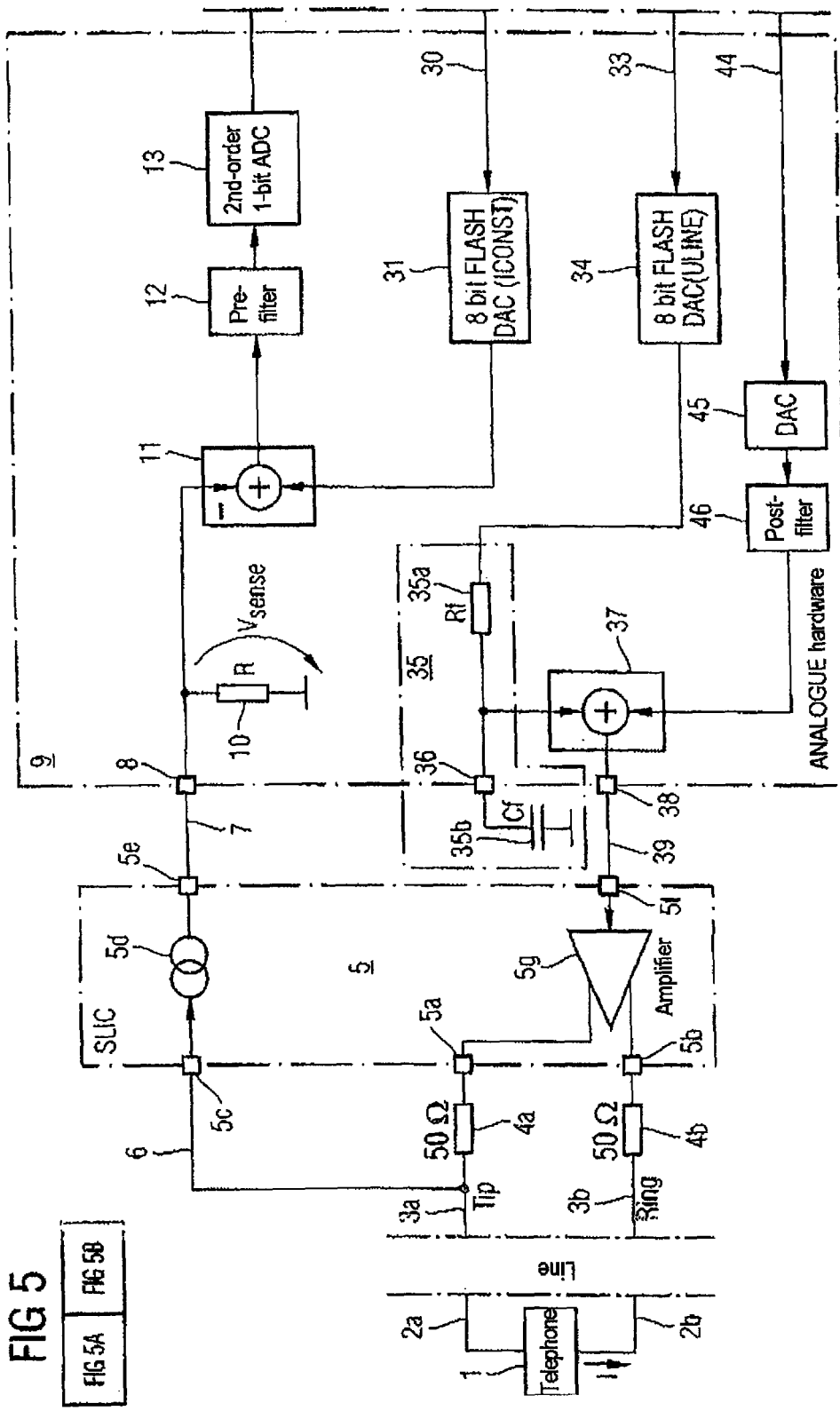

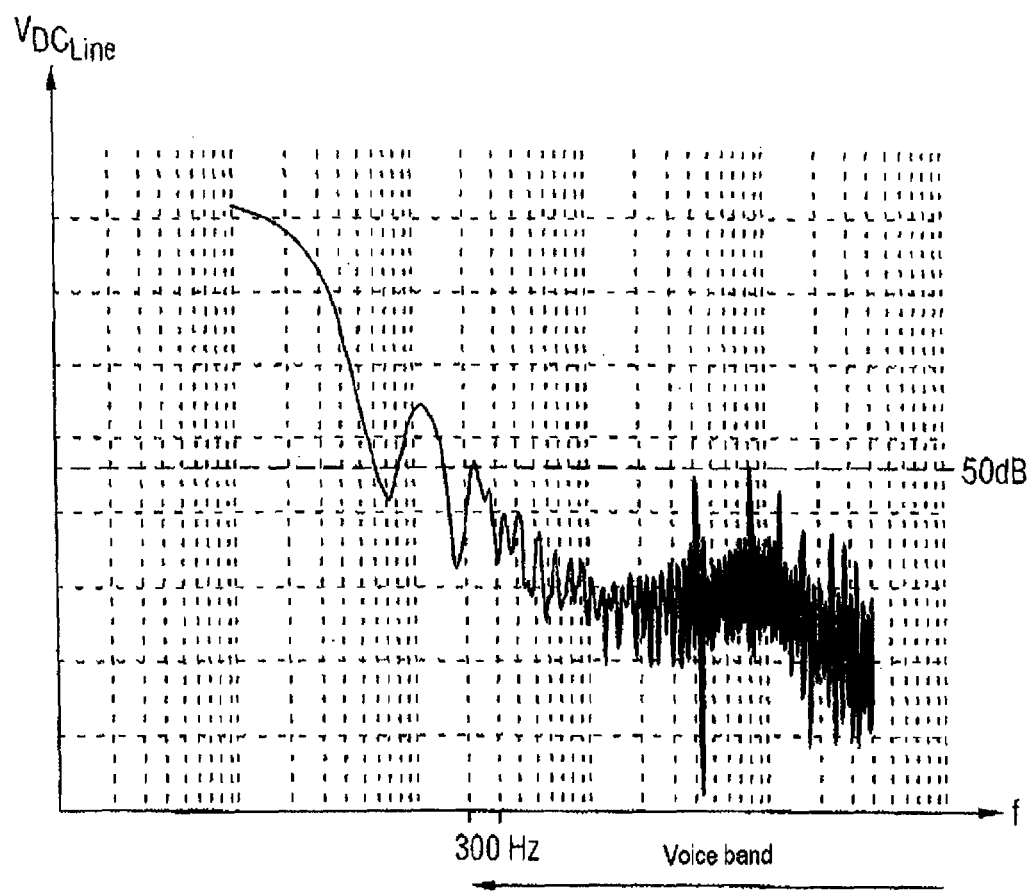

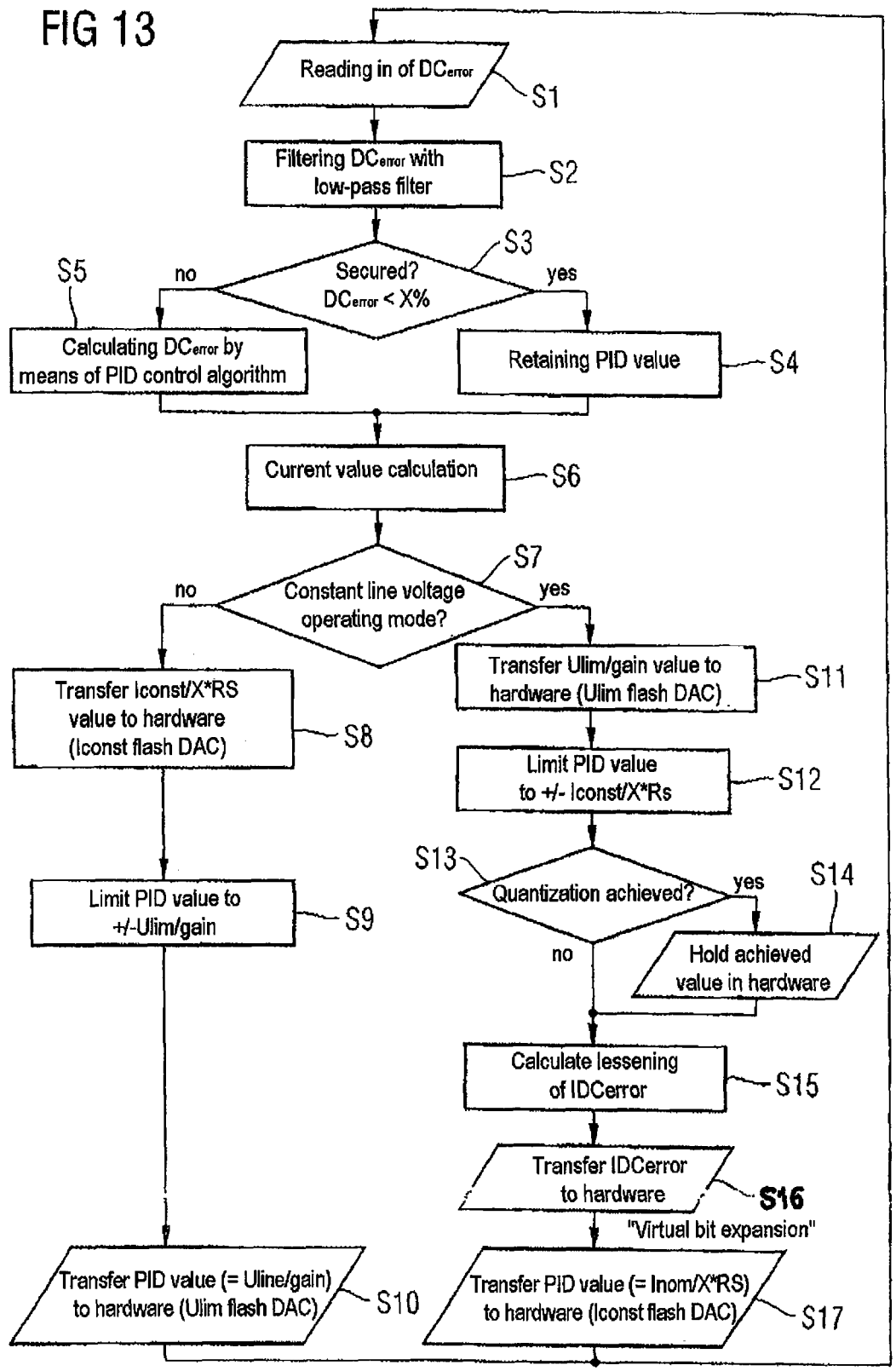

DEVICE FOR CONTROLLING A SUPPLY VOLTAGE FOR A TERMINAL

This application is a continuation of U.S. patent application Ser. No. 12/057,547 filed on 28 Mar. 2008, which claims priority to German Patent Application No. 10 2007 015 005.0 filed on 28 Mar. 2007, the content of both applications incorporated herein by reference in their entirety.

TECHNICAL BACKGROUND

The invention relates to a control circuit for controlling a DC supply voltage for a terminal, particularly for an analogue telephone of a public telephone network.

The telephone connection represents a network access to a telephone network (PSTN: public switched telephone network). Apart from the subscriber terminal, the in-house cabling, the subscriber line (TAL) and the subscriber line circuit in the telephone exchange (TVSt), the telephone connection also comprises the capability of usage contractually agreed with the network operator.

Subscriber terminals (TE: Terminal Equipment) can be both telephones and fax machines, PCs with modem or other technical facilities suitable for use in the network. A telephone connection can be arranged to be both analogue and digital. An analogue telephone connection is also referred to as POTS (plain old telephone system).

As a rule, telephones are connected with twisted pairs of telephone wires (wire pair), the interface to the connection of analogue terminals being called an a/b interface. The wire pairs are also designated as tip/ring. The a/b interface can be defined by various interface parameters, for example the loop current, the loop interruption, the idle and busy state and call dialling and talk state. Furthermore, a number of conditions must be met, for example attenuation distortion or noise level. These parameter conditions are prescribed specifically for each country.

FIG. 1 shows a conventional arrangement. A telephone is connected via a two-wire telephone subscriber line to a so-called SLIC circuit (subscriber line interface circuit). The SLIC circuit handles the so-called BORSCHT functions, where BORSCHT is an artificial word which stands for the following functions:
Battery (power feed),
Overvoltage (overvoltage protection),
Ringing (switching the caller to the subscriber),
Signalling,
Coding (DA/AD conversion and PCM encoding)
Hybrid (two-wire/four-wire conversion) and
Test (error detection).

Signalling is also understood to mean the supervision, i.e. the monitoring of the off-hook/on-hook state of the telephone. The analogue voice signal is transmitted in a voice frequency band within the range of about 0.3 to 3.4 kHz.

The telephone connection also provides the subscriber with access to the Internet by means of a temporary dial-up connection (dial-in) with interaction of a service provider. To transmit data in analogue telephone networks, voice band modems are used. In the telephone network, these behave like a telephone, i.e. for the data transmission, the digital signals are converted into analogue signals in the frequency band between 0.3 to 3.4 kHz.

Among other things, the SLIC circuit shown in FIG. 1 contains a current sensor for sensing the loop current on the telephone subscriber line. The loop current to the telephone subscriber line comprises a direct-current component for supplying the telephone and an alternating-current component for transmitting information, particularly voice information. The current sensor contained in the SLIC circuit delivers the sensed current, scaled, via a line to a subsequent so-called CODEC circuit. The CODEC circuit handles the analogue/digital conversion and, if necessary, PCM coding of the signal.

As can be seen from FIG. 1, the line current sensed by the SLIC circuit leads to a voltage drop across a resistor $R_{SENSE}$. The CODEC circuit contains an analogue connecting loop with a subtractor. A voltage generator generates a direct voltage of, for example, 1.2 V, the polarity of which can be inverted for signalling purposes. The voltage drop across the sensing resistor $R_{SENSE}$, which is proportional to the sensed line current, is subtracted from the generated direct voltage by means of the subtractor for generating a difference voltage. Apart from scaling the sensed current, the SLIC circuit also performs current limiting so that current peaks are limited, for example, to 60 mA. As can be seen in FIG. 1, the difference voltage generated in the CODEC circuit is delivered to a low-pass filter which comprises a resistor and an external capacitor $C_F$. The filtered difference voltage is applied to an input of the SLIC circuit which outputs the filtered difference voltage, amplified by an integrated amplifier, via stabilization and protective resistors to the telephone subscriber line of the telephone. The protective resistors have, for example, a resistance value of 50Ω and are used, for example, for protection against overvoltages which can be caused by a lightning stroke and for stabilization against oscillations.

FIG. 2 shows a conventional current/voltage characteristic of the voltage control shown in FIG. 1. The line current flowing on the telephone subscriber line TAL depends on the applied telephone line voltage. There is a predetermined open-loop voltage $V_0$ which is, for example, 48 V. Apart from the resistance of the telephone, the load applied to the SLIC circuit comprises the resistance of the telephone subscriber line TAL and the resistance of the stabilization resistors:

$$R_{LOAD} = R_{TEL} + R_{LINE} + R_{STAB}.$$

In this context, the resistance of the telephone is dependent on whether the analogue telephone is on-hook or off-hook. In the on-hook state, the resistance value of the telephone is very high and is some MΩ. In the off-hook state, the resistance of the analogue telephone is much lower and is, for example, between 10 and 600Ω. Due to the high telephone resistance, the operating point with the telephone replaced in the on-hook mode is located at the bottom right on the characteristic shown in FIG. 2. If the telephone is removed, an operating point AP which depends on the load resistance $R_{LOAD}$ is obtained on the characteristic. The lower the load resistance, the further away is the operating point in off-hook mode from the operating point in the on-hook state. In FIG. 2, two operating points AP1, AP2 are drawn by way of example, the load resistance being 430Ω at operating point AP1 and 100Ω at operating point AP2. The lower the load resistance $R_{LOAD}$, the higher the line supply current for the telephone.

The direct-voltage supply control according to the prior art, shown in FIG. 1, has the disadvantage that it is not suitable for long telephone lines. The longer the telephone line, the higher the load resistance $R_{LOAD}$ will be. The line current for supplying the telephone line must not drop below a certain minimum threshold value $I_{LINE-MIN}$ which is, for example, 18 mA. The longer the telephone line, the higher the load resistance $R_{LOAD}$ will be and the more the operating point AP in the off-hook state of the telephone will move towards the on-hook operating point and, at the same time, the supply line current $I_{LINE}$ will drop. If the supply line current drops below the predetermined threshold value, the telephone is no longer adequately supplied with energy.

A digital control circuit for controlling a DC supply voltage as shown in FIG. 3 has been proposed, therefore. In this arrangement, this digital control loop is integrated in a CODEC circuit.

FIG. 4 shows the entire CODEC circuit which contains a conventional digital control loop. The current sensed and scaled by the SLIC circuit is supplied to an analogue filter which separates it into an alternating-current component for the voice information contained in the current and into a direct-current component.

The alternating-current component is split off by means of a high-pass filter and, after filtering by an analogue prefilter contained in the CODEC circuit, is converted into a digital voice data signal by an AC analogue/digital converter. After downsampling by means of a downsampling unit, the digital voice data signal delivered by the terminal is again filtered by a digital AC filter and supplied to an adder which adds a digital signal delivered by a digital echo compensation filter for generating an aggregate signal which is evaluated via a further data processing unit, not shown.

The external resistance divider generates at a second input of the CODEC circuit a voltage proportional to the direct current flowing on the subscriber line, which is applied to the digital direct-voltage control loop contained in the CODEC circuit. An analogue low-pass prefilter contained in the CODEC circuit filters the applied voltage and applies this filtered voltage to the input of a DC analogue/digital converter which converts the applied voltage into a digital output signal. After downsampling by means of a downsampling unit, the direct-voltage value generated is delivered to a digital control circuit integrated in the CODEC circuit. This control circuit generates a voltage value, which is dependent on the direct current flowing on the subscriber line and, after upsampling by an upsampling unit, is supplied to a digital/analogue converter integrated in the CODEC circuit. The direct voltage generated by the digital/analogue converter is then applied, filtered by a low-pass filter, to a signal input of the SLIC circuit and, amplified there, is delivered to the terminal subscriber line.

Apart from the AC receive signal path for receiving the information data delivered by the terminal, the CODEC circuit also contains an AC transmit signal path for delivering information data to the terminal. For this purpose, a data signal coming from a data source is first filtered by a digital AC filter and delivered to an adder which adds a digital output signal from a digital impedance matching filter to form an aggregate signal which is upsampled by an upsampling unit and is then converted into an analogue signal by a further digital/analogue converter DAC. After filtering by an analogue output filter of the CODEC circuit, the alternating-voltage signal, amplified by a signal amplifier contained in the SLIC circuit, is also delivered to the subscriber line of the terminal.

The conventional direct-voltage control device for a terminal, shown in FIG. 4, has some disadvantages. Separation between the alternating-voltage signal sensed by the SLIC circuit and the direct-voltage signal is effected by an external analogue filter which, as can be seen from FIG. 4, comprises two resistors and two capacitors. These components cannot be integrated into the CODEC circuit according to the prior art. Accordingly, the CODEC circuit needs four terminal pins, namely two input terminal pins for the alternating-voltage signal and the direct-voltage signal and two output pins for the controlled direct-voltage output signal and the alternating-voltage signal for the terminal.

A further disadvantage of the CODEC circuit with integrated digital control loop, shown in FIG. 4, consists in that two separate analogue/digital converters ADC are needed, namely one for the received alternating-voltage signal (AC ADC) and a further analogue/digital converter for the received direct-voltage signal (DC ADC). In addition, the CODEC circuit shown in FIG. 4 needs two separate downsampling units. Providing two separate analogue/digital converters, in particular, considerably increases the required area in the case of integration on a chip.

It is an object of the present invention, therefore, to create a control device for controlling a supply voltage for a terminal which ensures an adequate power supply even for a terminal connected via a long subscriber line with minimum complexity in terms of circuitry.

SUMMARY OF THE INVENTION

The invention provides a control device for controlling a supply voltage which can be switched between a constant line current operation and a constant line voltage operation, wherein a line current, which consists of a direct current for supplying the terminal and of an alternating current for transmitting information, flows via a subscriber line of a terminal, comprising:
 a sensing circuit for sensing an analogue input voltage dependent on the line current,
 a subtractor which, in the constant line current operation, subtracts an analogue feedback voltage dependent on an adjustable nominal direct-current value from the sensed input voltage for generating an analogue difference voltage,
 an analogue/digital converter for converting the generated analogue difference voltage into a digital difference voltage value,
 a digital low-pass filter for filtering a sequence of control error values out of the generated sequence of difference voltage values,
 a controller for generating a control value in dependence on the filtered-out sequence of control error values, and comprising
 a first digital/analogue converter which, in the constant line current operation, converts the control value in each case generated by the controller into the analogue direct voltage for supplying the terminal.

An advantage of the control device according to the invention consists in that it can be programmed in a simple manner and can thus be adapted to country-specific parameter conditions.

The control device according to the invention also has the advantage that it manages with a minimum number of external components which are not integrated.

The control device according to the invention also has the advantage that it only needs one analogue/digital converter so that the required area of the control device according to the invention in the case of integration on a chip is very small.

In a preferred embodiment of the control device according to the invention, a digital adder is provided which adds the nominal direct current to the filtered-out sequence of control error values to form a sequence of aggregate current values.

In a preferred embodiment of the control device according to the invention, a first comparator is provided which compares the sequence of aggregate current values with a predetermined adjustable direct-current threshold value and, as soon as an aggregate current value drops below the direct-current threshold value, switches the control device from the constant line current operation to the DC line voltage operation.

In a preferred embodiment of the control device according to the invention, in the constant line current operation, the nominal direct-current value is converted into the analogue feedback voltage by a second digital/analogue converter.

In a preferred embodiment of the control device according to the invention, the analogue/digital converter is a sigma/delta analogue/digital converter.

In a preferred embodiment of the control device according to the invention, the controller is formed by a PID controller.

In a preferred embodiment of the control device according to the invention, the PID controller receives a value of zero as input value as long as a second comparator finds that the sequence of control error values is below a predetermined tolerance threshold value.

In a preferred embodiment of the control device according to the invention, the PID controller receives the filtered-out sequence of control error values as sequence of input values as soon as the second comparator finds that the sequence of control error values exceeds the predetermined tolerance threshold value.

In a preferred embodiment of the control device according to the invention, in the DC line current operation, the second digital/analogue converter converts the control value delivered by the controller into the analogue feedback voltage.

In a preferred embodiment of the control device according to the invention, in the DC line current operation, the first digital/analogue converter converts a fixed limit voltage value into a constant analogue output voltage for supplying the terminal.

In a preferred embodiment of the control device according to the invention, the analogue difference signal is delivered, filtered by an analogue prefilter, to the analogue/digital converter.

In a preferred embodiment of the control device according to the invention, the sequence of difference voltage values converted by the analogue/digital converter is downsampled by a first decimation filter.

In a preferred embodiment of the control device according to the invention, the sequence of difference voltage values downsampled by the first decimation filter is filtered by a digital high-pass filter for filtering out a sequence of information data.

In a preferred embodiment of the control device according to the invention, the DC output voltage delivered by the first digital/analogue converter is filtered by an analogue low-pass filter.

In a preferred embodiment of the control device according to the invention, an analogue adder is provided which adds the DC output voltage filtered by the analogue low-pass filter to an AC signal voltage to form an analogue output voltage.

In a preferred embodiment of the control device according to the invention, the output voltage is applied, amplified by an amplifier, to the subscriber line of a terminal.

In a preferred embodiment of the control device according to the invention, the amplifier is integrated in an SLIC circuit.

In a preferred embodiment of the control device according to the invention, the SLIC circuit has a current sensor for sensing the line current flowing in the subscriber line of the terminal.

In a preferred embodiment of the control device according to the invention, the SLIC circuit delivers the sensed line current, scaled, to the sensing circuit of the control device which generates an analogue input voltage proportional to the line current.

In a preferred embodiment of the control device according to the invention, the sensing circuit is formed by a resistor.

In a preferred embodiment of the control device according to the invention, the analogue low-pass filter has a switchable cut-off frequency.

In a preferred embodiment of the control device according to the invention, the first digital/analogue converter and the second digital/analogue converter are formed by flash digital/analogue converters.

In a preferred embodiment of the control device according to the invention, a compensation circuit for suppressing a quantization error generated by the second digital/analogue converter during the conversion of a ramp-shaped signal is provided.

In a preferred embodiment of the control device according to the invention, the compensation circuit is digitally configured.

In a preferred embodiment of the control device according to the invention, the digital compensation circuit follows the first decimation filter in the circuit.

In a preferred embodiment of the control device according to the invention, the control device is integrated in a CODEC circuit.

In a preferred embodiment of the control device according to the invention, the terminal is a telephone.

The invention also provides a line card comprising a CODEC circuit which contains a control device according to the invention for controlling a supply voltage and which has an SLIC circuit for connecting the terminal via a subscriber line.

The invention also provides a method for controlling a DC supply voltage for a terminal, comprising the following steps, namely sensing an analogue input voltage dependent on a line current, subtracting an analogue feedback voltage dependent on an adjustable nominal direct-current value from the sensed input voltage for generating an analogue difference voltage, converting the generated analogue difference voltage into a digital difference voltage value, filtering a sequence of control error values out of the generated sequence of difference voltage values, generating a control value in dependence on the filtered-out sequence of control error values, and converting the generated control value into the DC supply voltage.

The invention also provides a computer program for carrying out the method according to the invention.

The invention also provides a storage medium for storing a computer program for carrying out a method according to the invention.

BRIEF DESCRIPTION OF THE FIGURES

In the further text, preferred embodiments of the control device according to the invention and of the method according to the invention for controlling a supply voltage are described with reference to the attached figures for explaining features essential to the invention.

FIG. 12 shows a voltage spectrum which shows the line voltage in a control device according to the invention which contains a quantization compensation circuit;

FIG. 13 shows a flow chart of a possible embodiment of the method according to the invention for controlling a DC supply voltage.

DETAILED DESCRIPTION OF EMBODIMENTS

Figure 1:
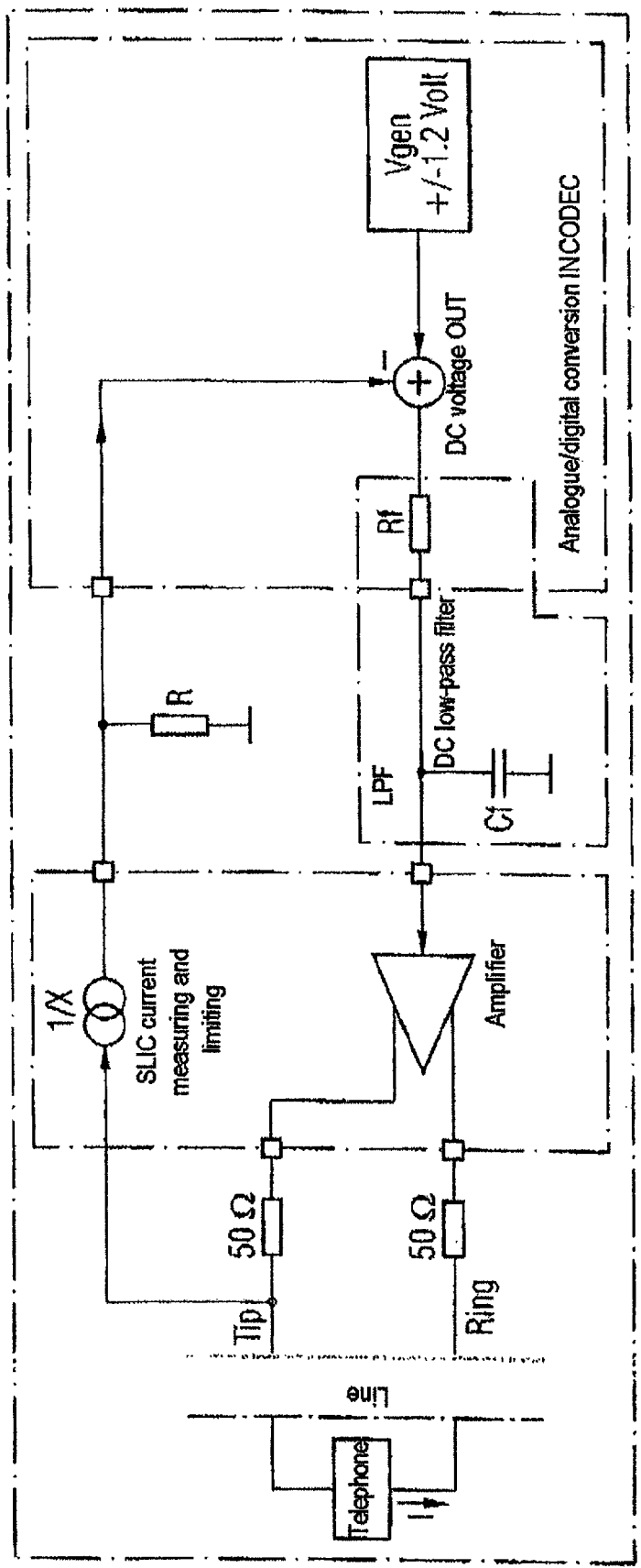
FIG. 1 shows an analogue control circuit for controlling a DC supply voltage for a terminal according to the prior art.
Figure 2:
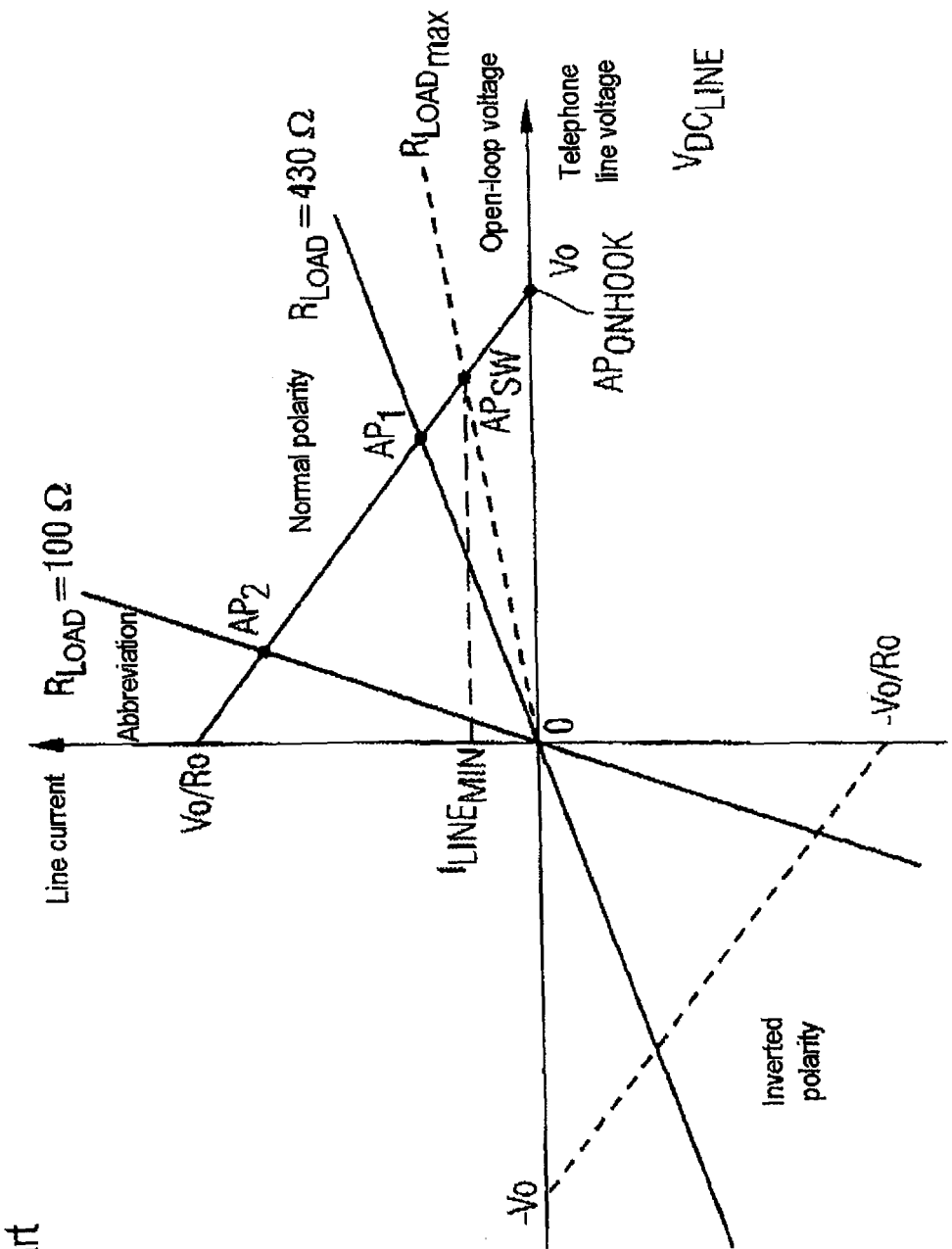
FIG. 2 shows a diagram for explaining the operation of the conventional analogue control device shown in FIG. 1.
Figure 3:
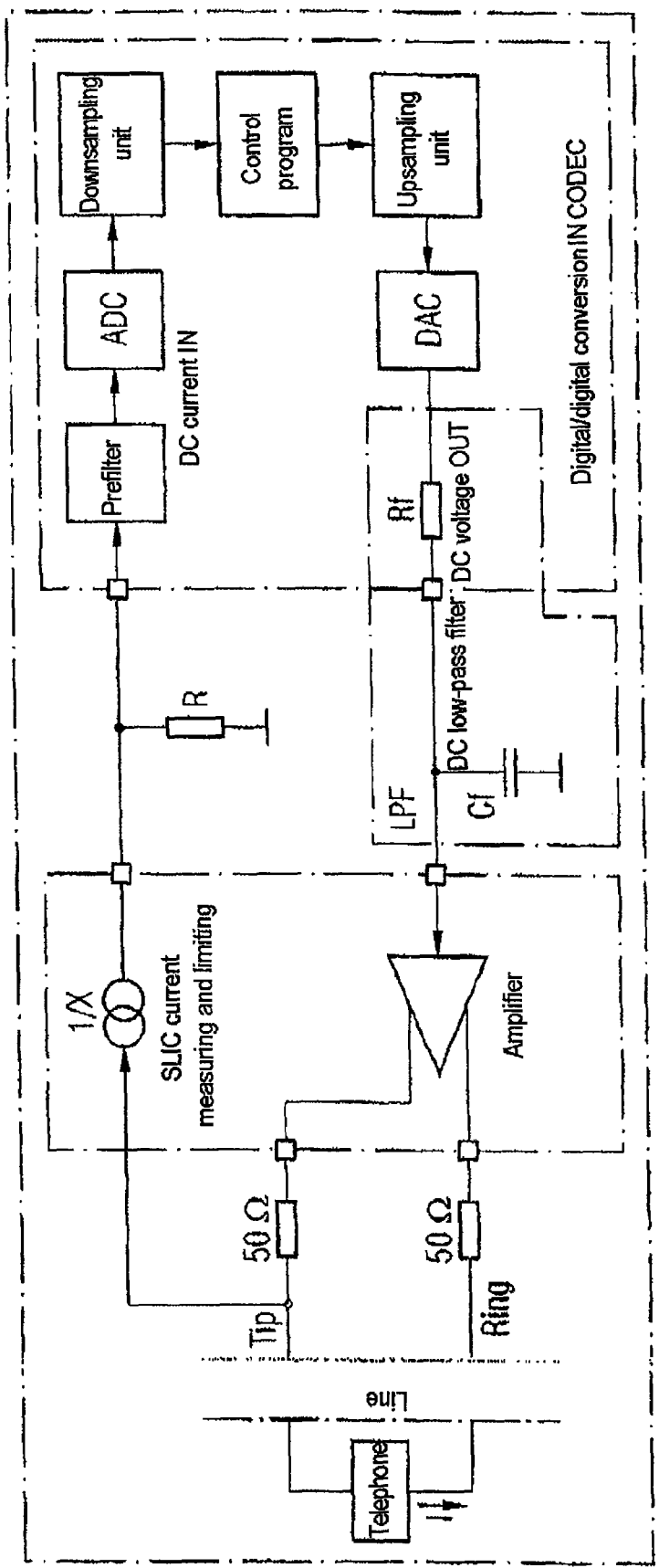
FIG. 3 shows a block diagram of a digital direct-voltage control loop within a CODEC circuit according to the prior art.
Figure 4:
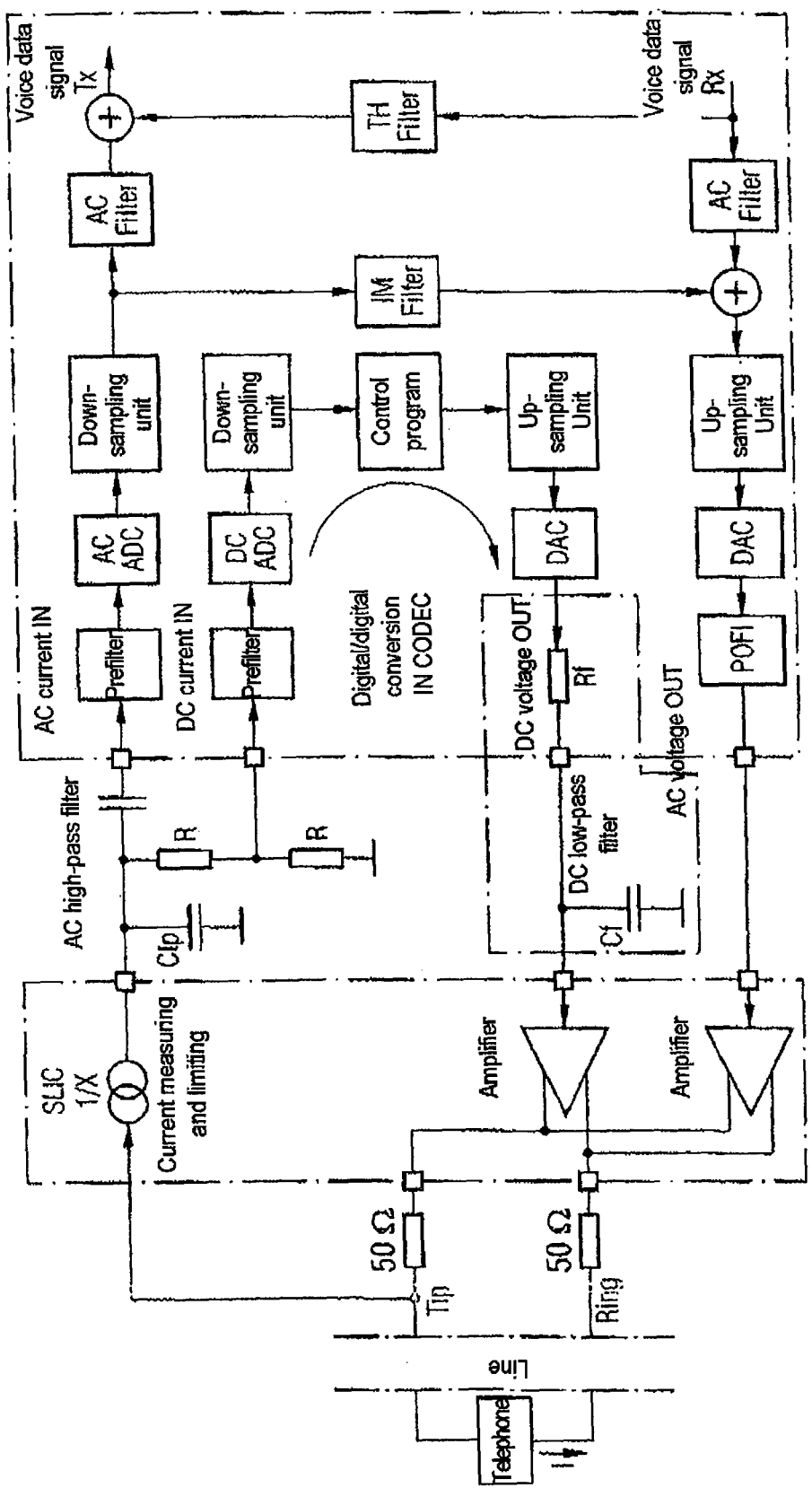
FIG. 4 shows a block diagram of a circuit arrangement with a conventional SLIC circuit and a conventional CODEC circuit according to the prior art which contains a digital direct-voltage control loop.

A terminal 1, for example an analogue telephone, is connected via subscriber lines 2a, 2b, for example a twisted two-wire telephone line, to a first terminal connection 3a and to a second terminal connection 3b. The two connections 3a, 3b are connected via protective or stabilization resistors 4a, 4b to output connections 5a, 5b of an SLIC (subscriber line interface circuit) circuit 5. At the tip connection 3a, the line current flowing via the terminal 1 is also picked up via a line 6 and supplied to a further input connection 5c of the SLIC circuit. The line current flowing via the subscriber lines 2a, 2b comprises a direct-current component $I_{DC}$ for supplying the terminal 1 and an alternating current $I_{AC}$ for transmitting information, for example voice information.

The SLIC circuit 5 contains a current sensor 5d which senses the line current and delivers it, scaled, via an output connection 5e of the SLIC circuit 5 and a line 7 to an input connection 8 of a CODEC circuit 9. The CODEC circuit 9 comprises an analogue circuit section and a digital circuit section. The CODEC circuit 9 contains a sensing circuit 10 for sensing an analogue input voltage $V_{SENSE}$ dependent on the line current. In the embodiment shown in FIG. 5, the sensing circuit of the CODEC circuit 9 is formed by a sensing resistor 10. The CODEC circuit 9 also contains a subtractor 11 which subtracts an analogue feedback voltage from the sensed input voltage dropped across the resistor 10 for generating a difference voltage $V_{DIFF}$. The difference voltage generated by the subtractor 11 is first filtered by an analogue prefilter 12 and then converted into a digital difference voltage value by an analogue/digital converter 13. The analogue/digital converter 13 is, for example, a second-order sigma/delta analogue/digital converter. The sequence of difference voltage values generated by the analogue/digital converter 13 is first downsampled by a subsequent decimation filter 14.

After the downsampling, a sequence of information data is split off by means of a digital high-pass filter 15 for the information signal delivered by the terminal 1, particularly a voice signal. The sequence of information data passes via a line 16 to an AC filter 17 and is added by means of an adder 18 to the signal delivered by an echo compensation filter 19 to form an aggregate signal which is supplied to a further data processing unit, not shown.

The downsampled sequence of difference voltage values delivered by the decimation filter 14 is also preferably supplied to a further decimation filter 20 for further downsampling and then filtered by a digital low-pass filter 21 in order to generate a sequence of control error values ($DC_{ERROR}$). The CODEC circuit 9 also contains a digital adder 22 which adds a nominal direct-current value to the filtered-out sequence of control error values to form a sequence of aggregate current values. The sequence of aggregate current values is supplied to a first comparator 23 which compares the supplied sequence of aggregate current values with a predetermined adjustable direct-current threshold value. As soon as the aggregate current value applied drops below the direct-current threshold value set, the comparator 23 generates a control signal which switches the control device from a constant line current operation to a DC line voltage operation. For this purpose, the comparator 23 drives switches within the control device. The CODEC circuit 9 contains a further comparator 24 which compares the sequence of aggregate current values with a further threshold value in order to find whether the terminal 1 is off the hook or not.

The CODEC circuit 9 contains a controller 24 for generating a control value in dependence on the sequence of control error values $DC_{ERROR}$ filtered out by the low-pass filter 21. The controller 24 is preferably a PID controller. The PID controller 24 receives a value of zero as input value as long as a further comparator 25 finds that the sequence of control error values $DC_{ERROR}$ is below a predetermined tolerance threshold value. As soon as the comparator 25 finds that the filtered-out sequence of control error values exceeds the predetermined tolerance threshold value, a switch 26 is driven which connects the output of the low-pass filter 21 to the input of the PID controller 24. The tolerance threshold value is, for example, 5% control error.

Figure 5B:
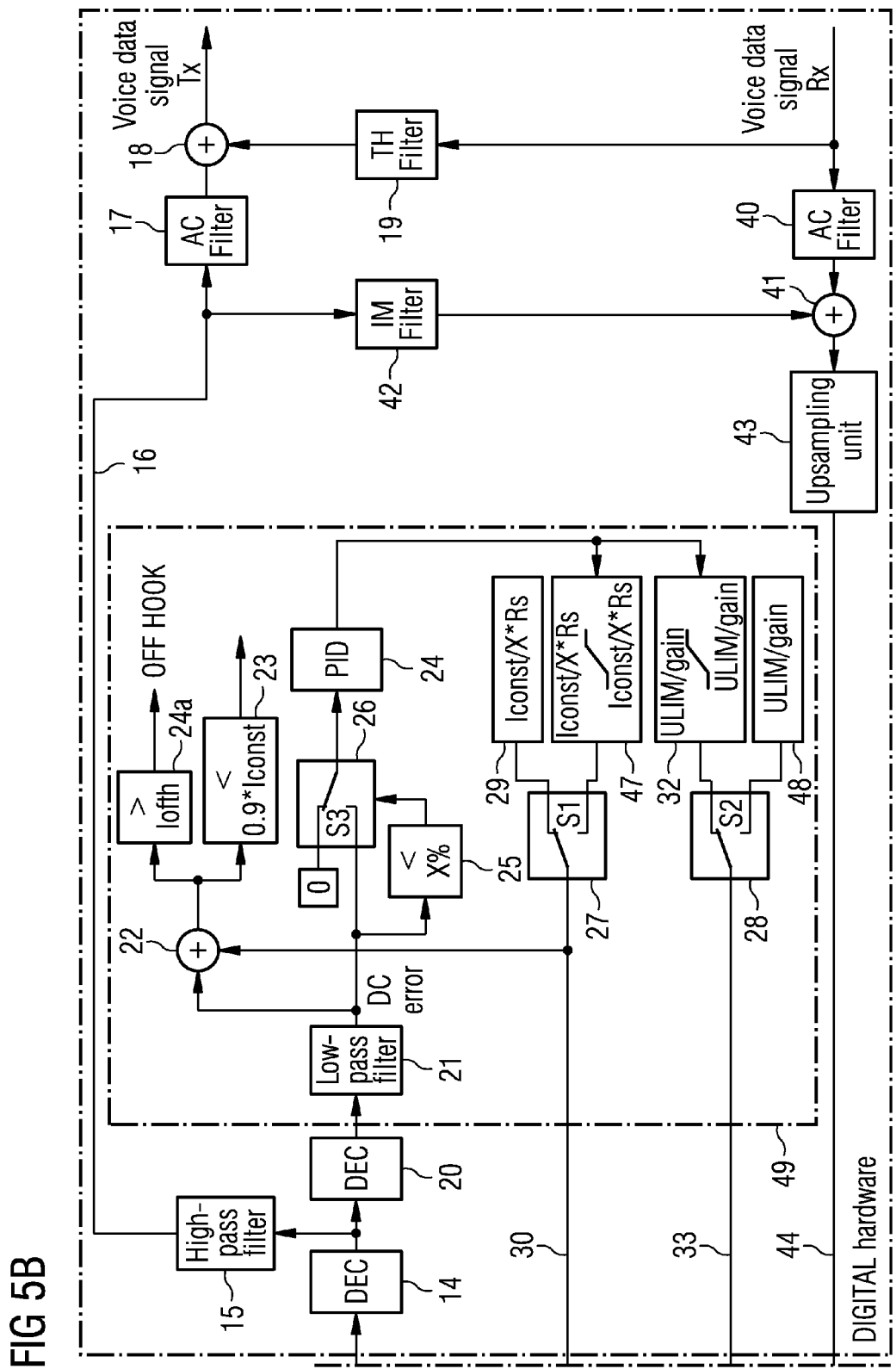
FIG. 5 shows a block diagram of a circuit arrangement which comprises a control device according to the invention for controlling a DC supply voltage for a terminal.

The control device according to the invention can be switched between a constant line current operation and a constant line voltage operation by means of switches 27, 28. FIG. 5 shows the switch position of the switches 27, 28 in the constant line current operation. In the constant line current operation, the terminal 1 is supplied with a constant current as long as the load allows it. The switches 27, 28 are switched by the control signal generated by the comparator 23. As soon as the aggregate current value drops below the adjustable direct-current value, the control device is switched from the constant line current operation as shown in FIG. 5 to the DC line voltage operation.

In the constant line current operation, a nominal direct-current value read out of a memory 29, for example, is supplied via the switch 27 and a line 30 to a first digital/analogue converter 31 which converts the supplied nominal direct-current value into a nominal direct voltage which is delivered to the subtractor 11 as feedback voltage. The subtractor 11 subtracts the nominal direct voltage generated by the digital/analogue converter 31 from the input voltage $V_{SENSE}$, which is proportional to the line current. The digital/analogue converter 31 is, for example, an 8-bit flash DAC. The control value generated by the controller is also limited by a unit 32 and, in the constant line current operation, supplied via the switch 28 and a line 33 to a further digital/analogue converter 34 which converts the control value into an analogue direct voltage. The DC output voltage delivered by the digital/analogue converter 34 is then filtered by an analogue low-pass filter 35 which comprises a resistor 35a, integrated in the CODEC circuit 9, and an external capacitor 35b connected via a connection 36, filtered and supplied to an analogue adder 37. The low-pass-filtered DC output voltage is then delivered to a signal input 5f of the SLIC circuit 5 via an output connection 38 of the CODEC circuit 9 and an external line 39. The SLIC circuit 5 contains a signal amplifier 5g which delivers the filtered output voltage signal-amplified to the telephone subscriber line for supplying the terminal 1.

The information data provided for the terminal 1 from a data source, not shown, are first filtered by an AC filter 40 contained in the CODEC circuit 9 and added by means of an adder 41 to a digital output signal of an impedance matching filter 42. The aggregate data signal thus formed is upsampled by an upsampling unit 43 and delivered to a digital/analogue converter via a signal line 44. The digital/analogue converter 45 converts the received information data into an alternating-voltage signal which is delivered, filtered by an analogue post-filter 46, to the adder 37.

If the control device is switched from the constant line current operation to the constant line voltage operation by the comparator 23, the digital/analogue converter 31 receives a control value via the switched switch 27. This control value is generated by the PID controller 24 and limited by a unit 47. Furthermore, the switch 28 is switched and the digital/analogue converter 34 receives a programmable limit-voltage value ($U_{LIMIT}$) for example from a buffer memory 48.

The control device according to the invention for controlling a supply voltage for a terminal 1 can be integrated as hardware within a CODEC circuit 9 as shown in FIG. 5. In alternative embodiments, some components of the control device according to the invention are replaced by a microprocessor 49 on which a control program based on firmware is running. For this purpose, the microprocessor 49 receives the sequence of difference voltage values downsampled by the decimation filter 20 as input and delivers output values to the digital/analogue converters 31, 34 via the lines 30, 33. Due to the programmability of the microprocessor 49, the control device 1 according to the invention can be easily adapted to country-specific parameters. The terminal 1 can be any analogue terminal, for example an analogue telephone or a fax machine. The low-pass filter 35 preferably has a switchable cut-off frequency, the cut-off frequency being increased for signalling.

Figure 6:
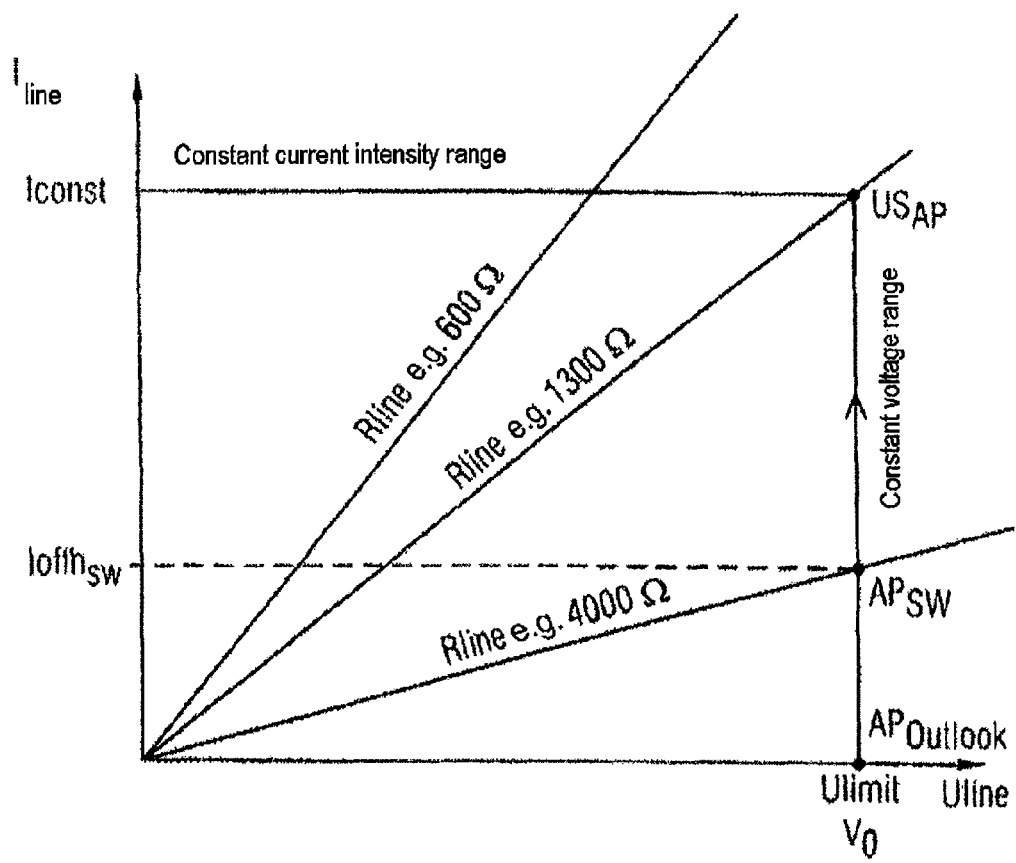
FIG. 6 shows a current/voltage characteristic for explaining the operation of the control device according to the invention.

FIG. 6 shows a current/voltage characteristic of the control device according to the invention. With the terminal 1 replaced, the system is at an on-hook operating point, i.e. the current flowing via the subscriber lines 2a, 2b is almost zero due to the very high resistance of the terminal 1. As soon as the terminal 1 is removed, the load resistance drops considerably and the line current $I_{LINE}$ flowing in the subscriber line 2a, 2b increases. As soon as a certain threshold value is exceeded, the comparator 24 finds that the telephone has been removed. The lower the load, the higher the current flowing in the line. At a switching point $US_{AP}$, the control device according to the invention switches from the constant line voltage operation to the constant line current operation in which a constant current $I_{const}$ flows in the subscriber line 2a, 2b. This constant current $I_{const}$ flows load-independently in the subscriber line and is thus also independent of the length of the subscriber line 2a, 2b. Conversely, with a large load, the control device according to the invention switches from the constant line current operation to the constant line voltage operation at the switching point $US_{AP}$. This reduction of the line current is effected by the control device according to the invention only with a very large load of, for example, 1300Ω and the line current is then reduced with increasing load, the voltage remaining the same, until a minimum permissible threshold value $AP_{SW}$ is reached. As can be seen from the current/voltage characteristic shown in FIG. 6, the analogue terminal 1 is supplied with a constant high supply current by the control device according to the invention even with a very high load resistance or with a long subscriber line. The current is only reduced with a large load of, for example, 1300Ω. The control device according to the invention allows a load resistance of, for example, up to 4000Ω. In the constant line current operation, the expected nominal direct current is subtracted from the sensed line current by means of the subtractor 11. The difference thus formed comprises the alternating-current component of the line current and a residual error which is used in the control loop for controlling the line voltage. The DC output voltage is filtered by the subsequent analogue low-pass filter 35.

In the constant line voltage operation, the line current is reduced in dependence on the load. As can be seen from FIG. 5, the alternating-current and direct-current information is converted into a digital output signal by the same analogue/digital converter 13, i.e. saving one analogue/digital converter in comparison with the conventional arrangement. The expected direct-current component is subtracted before the analogue/digital converter 13 by means of the subtractor 11 so that the analogue/digital converter 13 only has to convert the residual error. The nominal current value which, for example, is temporarily stored in a buffer memory 29, and the limit voltage value which, for example, is stored in a buffer memory 48, are converted by separate digital/analogue converters 31, 34, for example by means of flash DACs with 8-bit resolution. With a typical maximum DC supply voltage of 100 V, the quantization steps on the line are about 100 V/$2^7$=0.78 V for the line voltage and 50 mA/$2^7$=0.39 mA for the line current. The control loop is designed in such a manner that it locks to error values which are within a tolerance range of +/−5%. The output signal of the digital/analogue converters 31, 34 is therefore static at the operating point and only has a very slight influence on the noise present in the direct-voltage control loop. The bandwidth of the digital control loop is typically 1 kHz.

The low-pass filter supports the attenuation of the noise in the control loop in the voice transmission band from 300 Hz to 3400 Hz.

As can be seen from FIG. 5, only the capacitor 35b is provided as external component. All remaining components can be integrated on one chip.

Figure 7:
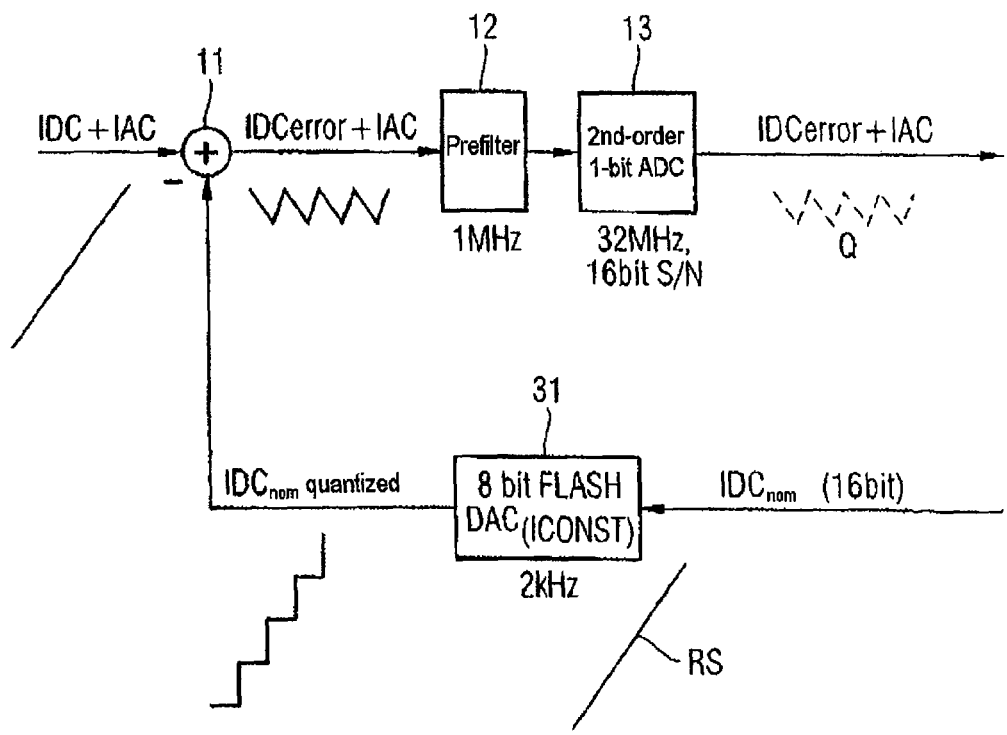
FIG. 7 shows a section from the circuit arrangement shown in FIG. 5.

FIG. 7 shows a section from the CODEC circuit shown in FIG. 5. For signalling purposes, the digital/analogue converter 31 receives from the microprocessor 49 a ramp-shaped signal, particularly with a polarity reversal of the direct voltage for sending an activation signal to the terminal 1. Due to the relatively low resolution of the 8-bit flash DAC 31, shown in FIG. 7, this direct current transition leads to a quantized output signal having relatively large quantization steps or, respectively, a large quantization error. After subtraction by means of the subtractor 11 and conversion by the digital/analogue converter, a disturbing quantization error also exists at the output of the analogue/digital converter 13, particularly in the voice transmission band.

Figure 8:
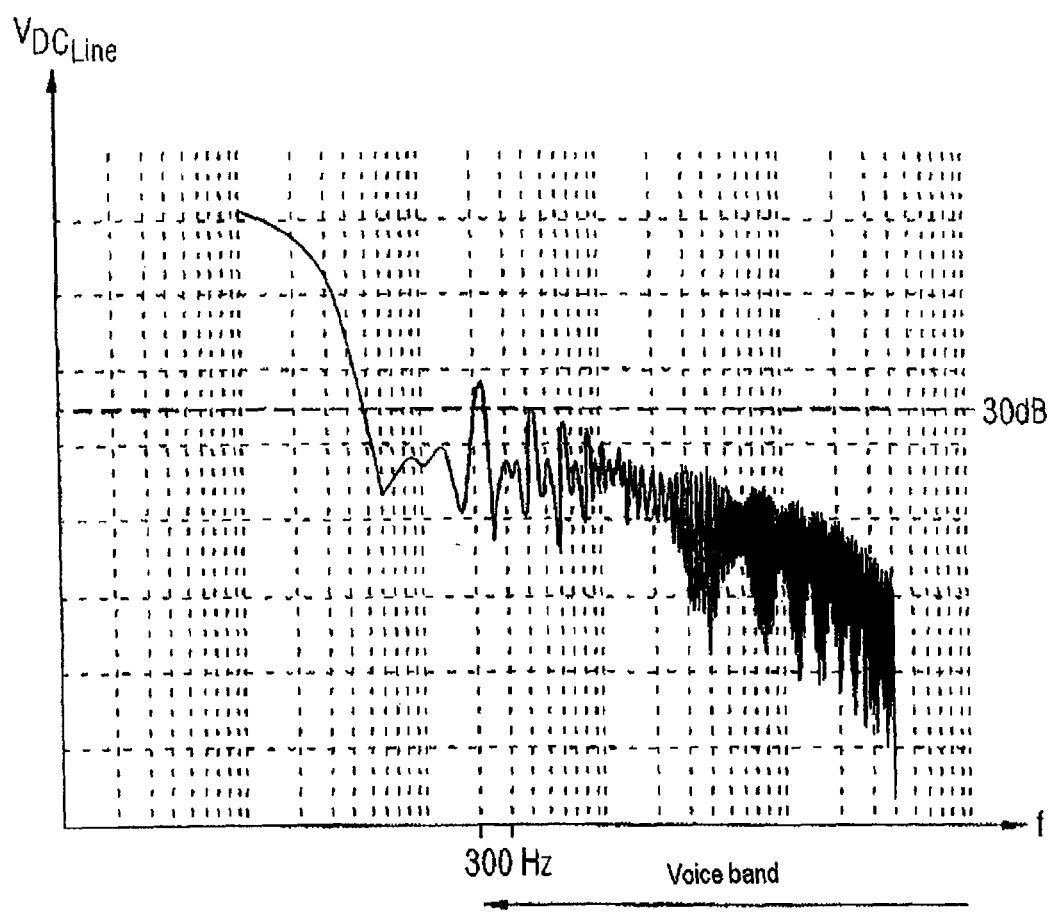
FIG. 8 shows a voltage spectrum of a line voltage without a compensation circuit, preferably provided in the control device according to the invention, for suppressing a quantization error.

FIG. 8 shows the spectrum of the voltage on the subscriber line without compensation of the quantization noise caused by the ramp-shaped signal. As can be seen from FIG. 8, the relative signal noise suppression in the voice band, i.e. above 300 Hz, is −30 dB.

Figure 9:
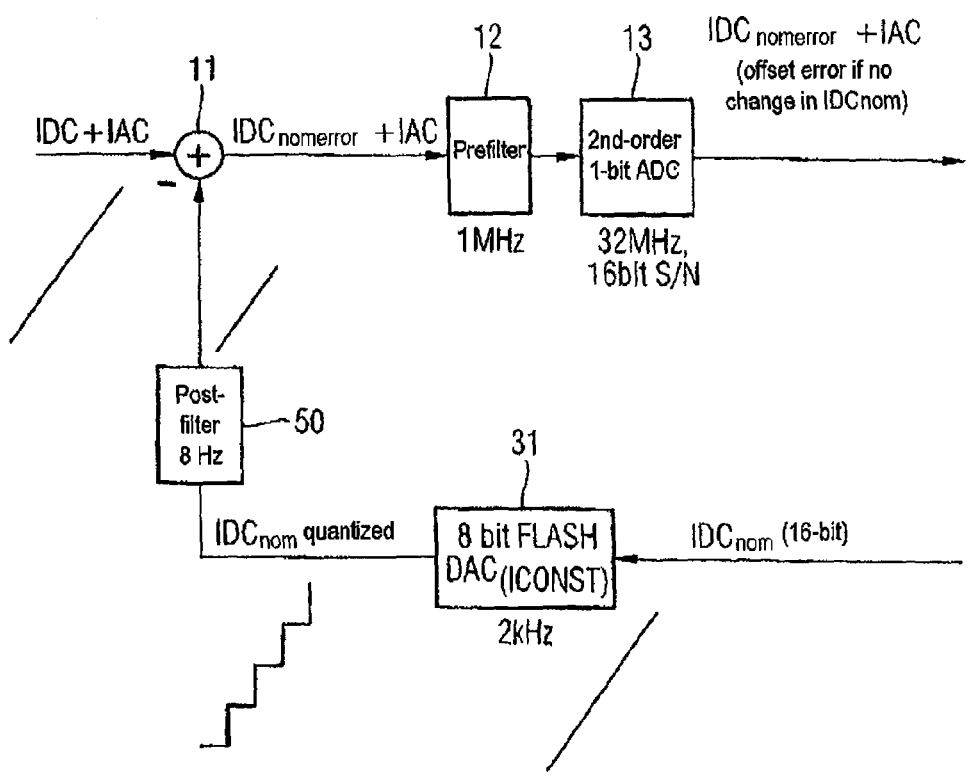
FIG. 9 shows a possible embodiment of the control device according to the invention with an additional filter for minimizing a quantization error.

FIG. 9 shows a first possibility for reducing the quantization noise in the voice transmission band. In this context, the digital/analogue converter 31 is followed in the circuit by an analogue low-pass filter 50 having a very low cut-off frequency. Such an analogue low-pass filter having a very low cut-off frequency needs an external capacitor, however, which cannot be integrated easily. In addition, there remains an offset error for a static nominal direct current.

Figure 10:
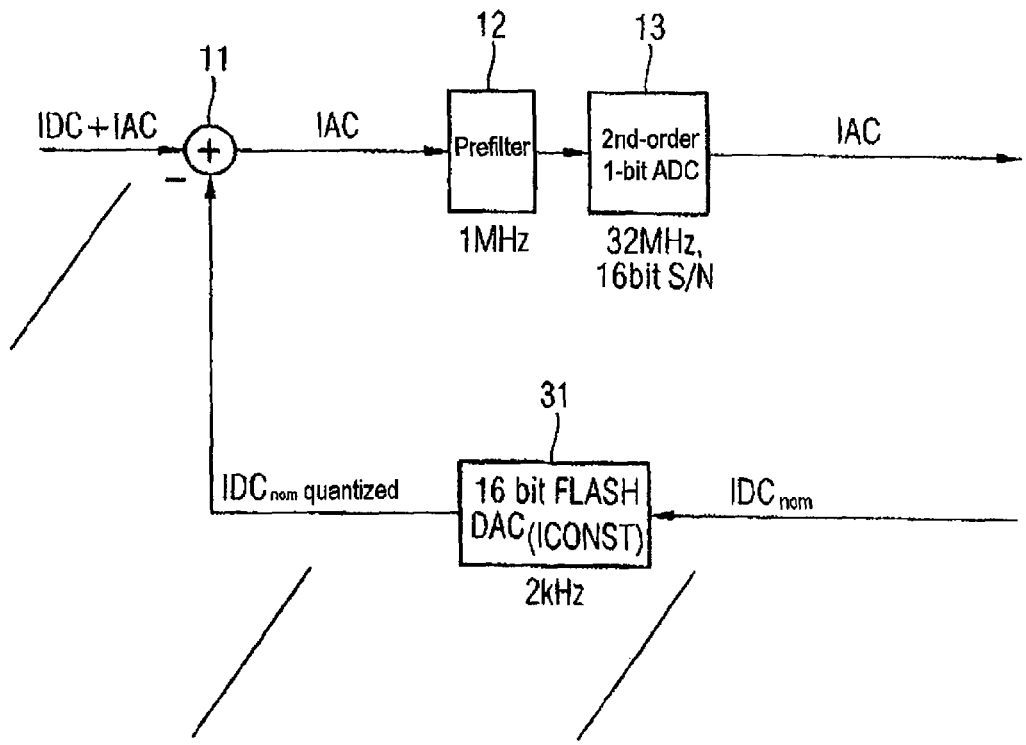
FIG. 10 shows a further possible embodiment of the control device according to the invention with a high-resolution flash digital/analogue converter.

FIG. 10 shows a further possibility for reducing the quantization error which is caused by a ramp-shaped signalling signal. In this context, a flash DAC having a high resolution, for example of 16 bits, is used. However, such a 16-bit DAC is relatively complex with regard to circuitry and needs a correspondingly large silicon area in the integration.

Figure 11:
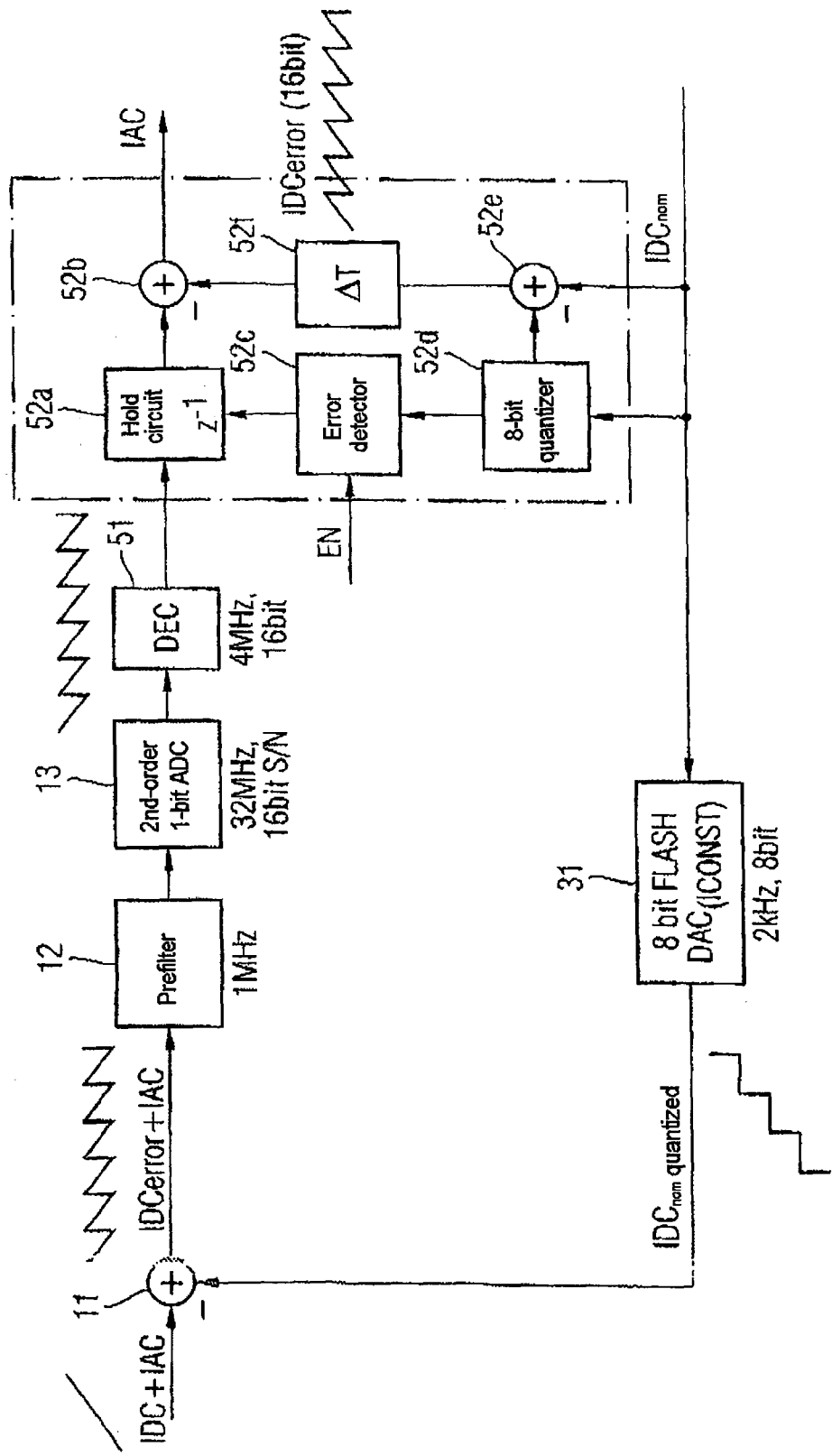
FIG. 11 shows a preferred embodiment of the control device according to the invention with a compensation circuit for suppressing a quantization error.

FIG. 11 shows a preferred embodiment for minimizing a quantization noise caused by a ramp-shaped signalling signal. In this arrangement, the analogue/digital converter 13 is followed in the circuit by a further decimation filter 51 for downsampling the data stream delivered by the analogue/digital converter 13. The downsampled data stream is supplied to a digital compensation circuit 52. The compensation circuit 52 contains a holding element 53a with programmable holding time which is followed in the circuit by an adder 52b. The holding element 52a can be activated by a deviation detector 52c. A quantizer 52d provided in the compensation circuit 52 receives, for example, the nominal direct-current value comprising 16 bits. As soon as any bit of the eight MSBs, i.e. the eight more significant bits, of the current value present changes, the quantizer 52d delivers an indicator flag to the deviation detector 52c which activates the holding element 52a. The output value generated by the quantizer 52d is also supplied to a subtractor 52d which subtracts this output value from the received nominal current value comprising 16 bits and supplies the difference value thus formed to a delay element 52f. The delay element 52f is provided for compensating for transit time differences.

Since the time at which the digital/analogue converter is switched and the difference between the quantized signal and the ideal signal is known, the known quantization current error is subtracted by means of the compensation circuit 52. The holding element 52a holds the input signal for a short time in order to avoid voltage peaks.

As soon as the control device according to the invention has reached the final operating point, the output signal of the flash DAC 31 can be assumed to be static or constant. It is possible, therefore, in a preferred embodiment to switch off the compensation circuit 52 according to the invention after the operating point has been reached.

FIG. 12 shows the spectrum of the voltage at the subscriber line when using the compensation circuit 52. As can be seen from FIG. 12, the relative signal/noise ratio is −50 dB, i.e. the noise is lowered by 20 dB in comparison with a circuit arrangement without compensation circuit 52. Since 20 dB gain in noise corresponds approximately to a resolution of 3 bits, conversely a converter having about 3 bits less resolution can be used with the same noise. Thus, the bit width of the digital/analogue converter 31 can be virtually extended by using the compensation circuit 52.

FIG. 13 shows a flow chart for a possible control program which runs on the microprocessor 49 shown in FIG. 5.

Firstly, the sequence of control error values $DC_{ERROR}$ is read in in a step S1.

In a step S2, the sequence of control error values read in is low-pass-filtered.

In a step S3, a check is made to ascertain whether the filtered control error lies within a tolerance threshold value range of, for example, 5%. If this is so, the previous control value is retained in a step S4. If the control error is outside the tolerance range, a control value is calculated, for example by means of a PID control algorithm, in dependence on the sequence of control error values in a step S5.

In a step S6, a current value is calculated from the control value generated.

In a step S7, a check is made to ascertain whether the system is in a constant line current operating mode or in a constant line voltage operating mode. If the control process is in the constant line current operation, a nominal direct-current value is read out of a programmable memory in a step S8 and delivered by the microprocessor 49 via the output line 30 to the 8-bit flash DAC 31 shown in FIG. 5 for conversion into an analogue feedback signal.

In a step S9, the control value is then limited and, in a step S10, delivered by the microprocessor 49 via the output line 33 to the 8-bit flash DAC 34, shown in FIG. 5, for generating a DC output voltage. After step S10, the microprocessor 49 returns to step S1.

If it is found in step S7, that the control process is in a constant line voltage operation, in a step S11 a maximum voltage value is read out of a programmable memory and this value is delivered via an output line 33 to the 8-bit flash DAC 34 for forming a DC output voltage.

In a step S12, the control value is limited and then, in a step S13, a check is made to ascertain whether the necessary quantization has been reached. If this is so, the achieved value is held in step S14.

Following this, the current error $IDC_{ERROR}$ is calculated in step S15 and delivered in step S16.

The calculated control value is delivered to the flash DAC 31 in step S17.

The invention claimed is:

1. A method of switching a control device for a line terminal between a constant line current operation and a constant line voltage operation, the method comprising:
    adding a nominal direct-current value to a sequence of control error values which indicate a difference between an analogue feedback voltage and an analogue input voltage sensed at the line terminal, to form a sequence of aggregate current values; and
    switching the control device from the constant line current operation to the constant line voltage operation responsive to one of the aggregate current values dropping below a predetermined adjustable direct-current threshold value.

2. The method according to claim 1, wherein switching the control device from the constant line current operation to the constant line voltage operation comprises:
    comparing the sequence of aggregate current values to the predetermined adjustable direct-current threshold value;
    generating a control signal responsive to one of the aggregate current values dropping below the predetermined adjustable direct-current threshold value; and
    switching the control device from the constant line current operation to the constant line voltage operation responsive to control signal being generated.

3. A control device, comprising:
    a sensor operable to sense a line current representing a voice signal;
    an analog-to-digital converter operable to convert an alternating-current component and a direct-current component of the sensed line current to a digital output signal; and
    a circuit operable to process the digital output signal representing the alternating-current and direct-current components to determine whether to switch the control device from a constant line current operation to a constant line voltage operation.

4. The control device according to claim 3, wherein the circuit is operable to supply a terminal which generated the voice signal with a constant line current regardless of load resistance in the constant line current operation.

5. The control device according to claim 4, wherein the circuit is operable to switch the control device from the constant line current operation to the constant line voltage operation if the load resistance rises above a predetermined value.

6. The control device according to claim 5, wherein the predetermined value is 1300Ω.

7. The control device according to claim 3, wherein the circuit is operable to supply a terminal which generated the voice signal with a line current which depends on load resistance in the constant line voltage operation.

8. The control device according to claim 7, wherein the circuit is operable to switch the control device from the constant line voltage operation to the constant line current operation if the load resistance falls below a predetermined value.

9. The control device according to claim 8, wherein the predetermined value is 1300Ω.

10. The control device according to claim 3, wherein the circuit is a codec.

11. The control device according to claim 3, wherein the circuit is a microprocessor.

12. The control device according to claim 3, wherein the circuit is further operable to:
sense an analogue input voltage dependent on the line current, the line current flowing via a communication line of a terminal;
generate an analogue difference voltage in the constant line current operation based on a difference between the sensed analogue input voltage and an analogue feedback voltage which depends on an adjustable nominal direct-current value;
filter a sequence of control error values from a sequence of digital difference voltage values converted from the generated analogue difference voltage;
convert a control value generated from the sequence of control error values in the constant line current operation to an analogue direct voltage for supplying the terminal; and
convert the nominal direct-current value into the analogue feedback voltage in the constant line current operation.

13. The control device according to claim 12, wherein the circuit is further operable to add the nominal direct-current value to the sequence of control error values to form a sequence of aggregate current values.

14. The control device according to claim 13, wherein the circuit is operable to compare the sequence of aggregate current values with a predetermined adjustable direct-current threshold value and switch the control device from the constant line current operation to the constant line voltage operation responsive to one of the aggregate current values dropping below the direct-current threshold value.

15. The control device according to claim 12, wherein the circuit comprises a controller operable to receive a value of zero as an input value responsive to the sequence of control error values being below a predetermined tolerance threshold value.

16. The control device according to claim 15, wherein the controller is operable to receive the sequence of control error values as a sequence of input values responsive to the sequence of control error values exceeding the predetermined tolerance threshold value.

17. The control device according to claim 12, wherein the circuit is operable to convert a fixed limit voltage value into a constant analogue output voltage in the current line current operation for supplying the terminal.

18. The control device according to claim 12, wherein the circuit is operable to filter the analogue direct voltage.

19. The control device according to claim 18, wherein the circuit is operable to add the filtered analogue direct voltage to an AC signal voltage to form an analogue output voltage applied to the communication line of the terminal.

20. A method of controlling a supply voltage for a terminal coupled to a control device, the method comprising:
sensing a line current representing a voice signal;
converting an alternating-current component and a direct-current component of the sensed line current to a digital output signal; and
processing the digital output signal representing the alternating-current and direct-current components to determine whether to switch the control device from a constant line current operation to a constant line voltage operation.

21. The method according to claim 20, further comprising supplying a terminal which generated the voice signal with a constant line current regardless of load resistance in the constant line current operation.

22. The method according to claim 21, further comprising switching the control device from the constant line current operation to the constant line voltage operation if the load resistance rises above a predetermined value.

23. The method according to claim 20, further comprising supplying a terminal which generated the voice signal with a line current which depends on load resistance in the constant line voltage operation.

24. The method according to claim 23, further comprising switching the control device from the constant line voltage operation to the constant line current operation if the load resistance falls below a predetermined value.

25. The method according to claim 20, wherein processing the alternating-current and direct-current components of the digital output signal comprises:
sensing an analogue input voltage dependent on the line current, the line current flowing via a communication line of a terminal;
generating an analogue difference voltage in the constant line current operation based on a difference between the sensed analogue input voltage and an analogue feedback voltage which depends on an adjustable nominal direct-current value;
filtering a sequence of control error values from a sequence of digital difference voltage values converted from the generated analogue difference voltage;
converting a control value generated from the sequence of control error values in the constant line current operation to an analogue direct voltage for supplying the terminal; and
converting the nominal direct-current value into the analogue feedback voltage in the constant line current operation.

26. The method according to claim 25, further comprising adding the nominal direct-current value to the sequence of control error values to form a sequence of aggregate current values.

27. The method according to claim 26, further comprising:
comparing the sequence of aggregate current values with a predetermined adjustable direct-current threshold value; and switching the control device from the constant line current operation to the constant line voltage operation responsive to one of the aggregate current values dropping below the direct-current threshold value.

28. The method according to claim 25, further comprising receiving a value of zero as an input value at a controller of the control device responsive to the sequence of control error values being below a predetermined tolerance threshold value.

29. The method according to claim 28, further comprising receiving the sequence of control error values as a sequence of input values at the controller responsive to the sequence of control error values exceeding the predetermined tolerance threshold value.

30. The method according to claim 25, further comprising converting a fixed limit voltage value into a constant analogue output voltage in the current line current operation for supplying the terminal.

31. The method according to claim 25, further comprising filtering the analogue direct voltage.

32. The method according to claim 31, further comprising adding the filtered analogue direct voltage to an AC signal voltage to form an analogue output voltage applied to the communication line of the terminal.

* * * * *